UNITED STATES PATENT OFFICE.

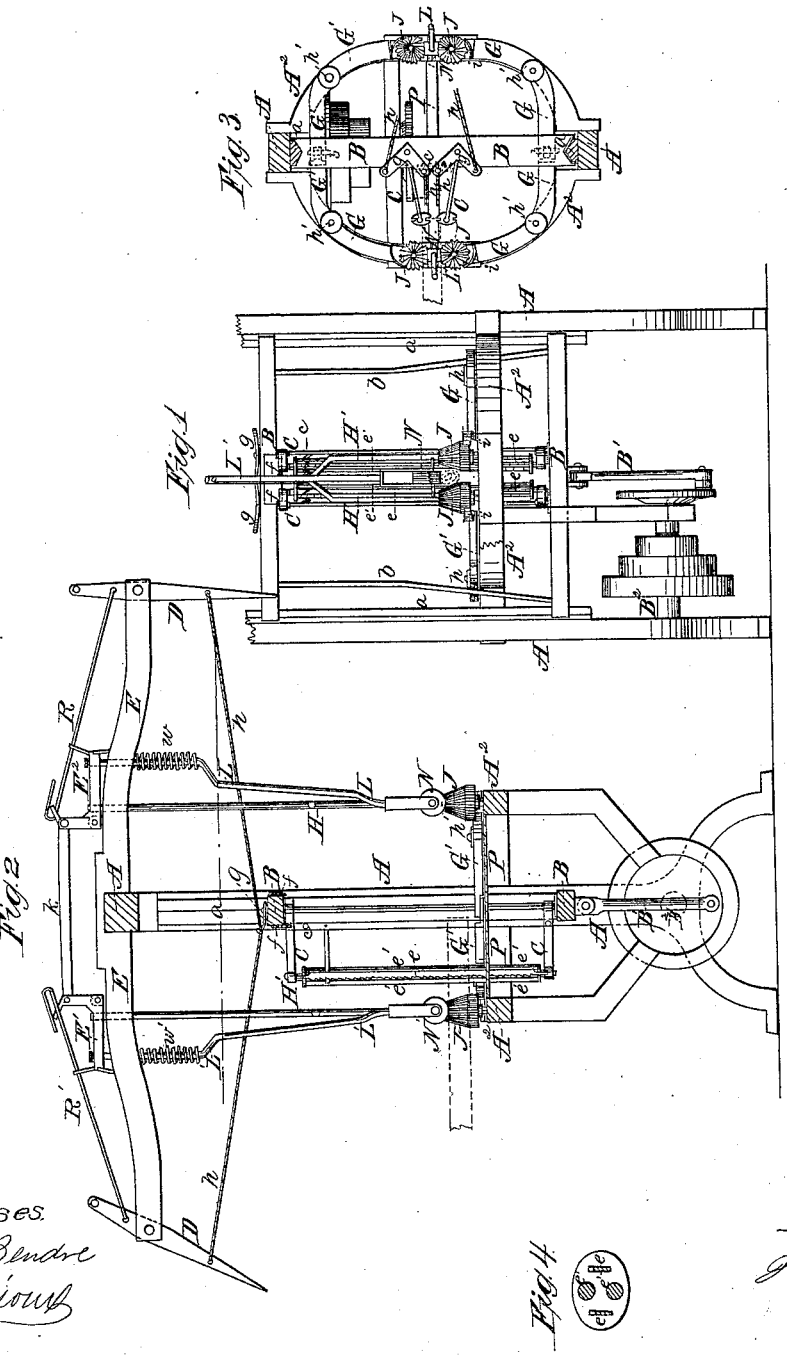

JOSEPH RAUB, OF HIGHLAND, PENNSYLVANIA.

HOOP-SAWING MACHINE.

Specification of Letters Patent No. 29,993, dated September 11, 1860.

*To all whom it may concern:*

Be it known that I, JOSEPH RAUB, of Highland, in the county of Bradford and State of Pennsylvania, have invented certain new and useful Improvements in Machines for Sawing Hoops; and I do hereby declare that the following is a full, clear, and exact description thereof, reference being had to the accompanying drawings, making part of this specification, in which—

Figure 1 is a front elevation of the machine for sawing hoops. Fig. 2 is a longitudinal vertical section taken through the middle of Fig. 1. Fig. 3 is a section through the horizontal plane indicated by red lines $x$, $x$, Fig. 2. Fig. 4 is a horizontal section through one of the saws and its rollers.

Similar letters of reference indicate corresponding parts in the four figures.

This invention relates to certain improvements in machines for sawing hoops from poles, whereby the work is greatly facilitated and two hoops may be sawed from a pole at one operation and they may be fed both ways to the saw.

My invention consists in hanging in a vertical reciprocating saw frame two swinging saw gates carrying, each, a narrow saw and two rollers, one on each side of the saw, whereby two hoops may be sawed from a pole at one time, the poles passing from either side of the machine.

It further consists in connection with the swinging saws in arranging on each side of an elliptical, or other suitable shaped frame, which serves as a table, a pair of fluted conical feed rollers that are operated by levers and pawls, with the up and down motion of the saw frame, and over each pair is arranged a feed pressure roller, as will be hereinafter described, whereby the feed rollers will be accommodated to the varying sizes of one pole or any number of poles, and the feed motion will be kept up uniformly in sawing poles of a large or small diameter.

It also consists in a novel arrangement of knee levers and slotted connecting rods with hand levers for applying and relieving the pressure rollers alternately as will be hereinafter described.

To enable those skilled in the art to fully understand my invention I will proceed to describe its construction and operation.

In the drawings A A are two uprights connected together at their tops by a cross bar A' and furnished with suitable legs. These with the circular or elliptical table $A^2$ constitute the frame work of the machine. Within this frame, and secured to the two uprights, are guide-strips $a\ a$ between which is placed the saw frame B consisting of two horizontal cross pieces with V grooves in their ends connected together by two bent rods $b$, $b$, the rods are bent inward. This saw frame B receives a rectilinear reciprocating motion from a pitman B' connected with a crank wheel on a cone pulley shaft $B^2$ as represented in Figs. 1 and 2 of the drawings.

C, C, are two saw gates that are pivoted to the top and bottom cross pieces of the saw frame B, so as to be perpendicular to these pieces near the middle of the saw frame, and they are connected together by a suitable spring $c$, Fig. 1, which operates so as to draw the saws in each gate or the ends of the gate toward each other. The saws $e$, $e$, each gate having two; are hung in a suitable manner in the ends of each gate, with their teeth pointing outward, or from the center of the machine, and between the saws in each gate are placed two rollers $e'\ e'$ leaving a space between each saw and the rollers sufficient for a hoop to pass endwise. $f$ are plates to prevent the ends of the saw gates from being drawn together by the force of spring $c$; these saws, with the gates, are moved up and down with the saw frame B.

The pins that pivot the saw gates, at their upper ends, to the frame B, pass through the cross piece and receive right angular levers $g$, $g$, Fig. 3, on their ends, these levers are keyed to the pins. To the ends of these levers are attached suitable cords or chains $h\ h\ h\ h$ which are carried out from each side of the frame, B, and connected to hand levers D, D, which levers have their fulcra in the ends of a cross beam E. By drawing alternately on these levers D, D, the saw gates will be changed around from one side to the other of the table $A^2$ they will be swung in an opposite position to that shown in the drawings so that the sawing may take place from the opposite side of the table. Thus when the poles are passed through the machine from one side to saw off two hoops from each side of a pole the same pole may be passed back again for sawing the two other hoops off there being four hoops sawed from each pole. G, G, G', G', are four bent levers that are pivoted to the top of the table $A^2$ at $h'$ $h'$ $h'$ $h'$, these levers receive a vibrating motion from the bent rods $b$, $b$, which pass through slots made in one end or arm of each lever, the opposite arms of these levers have spring pawls $i$, $i$, attached to them which actuate feeding cones, J, J, J', J', as the levers G, G, G', G', vibrate, by engaging with ratchet teeth cut near the bases of these cones.

The cones, J, J', are fluted so as to prevent them from stopping in the operation of feeding, and they are placed loosely on the ends of bifurcated rods H H' which stand perpendicular to the table A'. The cones are placed directly opposite each other on the table $A^2$ and they rest on the ends of the levers G, G, G', G'.

The rods H, H', pass up through the cross beam F and are attached to right angular levers E', $E^2$, that have their fulcra on the beam E. The two upright arms of levers E' $E^2$ are connected together by a rod K as clearly shown in Fig. 2, while to the ends connected by slip points the spring bars L, L', that carry on their lower ends grooved pressure rollers N, N', which rollers are between and above the cones J, J, J', J', as shown in the drawings. The bifurcated rods serve as guides for plates carrying the pressure rollers.

P is a bar extending across the table $A^2$ which serves as a guide and a rest for the ends of the poles passing back and forth through the machine.

$m$ $m'$ are springs that act upon the bars L, L', to keep the rollers N, N', down on the work and allow them to yield to the irregularities of the poles and to accommodate themselves to poles of different diameters. The annular grooves in these pressure rollers prevent the poles from rotating while they are being sawed. R, R' are rods, that have slotted ends, which are connected to the upright arms of the levers E', $E^2$ and to the hand levers D, D, so that by forcing one of the hand levers inward the pressure roller rod on the opposite side of the machine will be raised, while the other rod will be depressed.

Having thus described my invention what I claim as new and desire to secure by Letters Patent is,

1. The conical feed rollers actuated by levers G, G, G', G', and rods $b$, $b$, in combination with the pressure rollers N, N', arranged combined and operating substantially in the manner herein set forth.

2. The levers D, D, connecting rods R, R', levers E', $E^2$, conecting rod K, with the pressure roller rods L, L, in combination, as and for the purpose herein set forth.

3. The gage rollers $e'$, $e'$, in combination with the saws $e$, for the purpose of keeping the sawed work an even thickness throughout as set forth.

JOS. RAUB.

Witnesses:
L. W. BENDRÉ,
B. GIROUX.